UNITED STATES PATENT OFFICE.

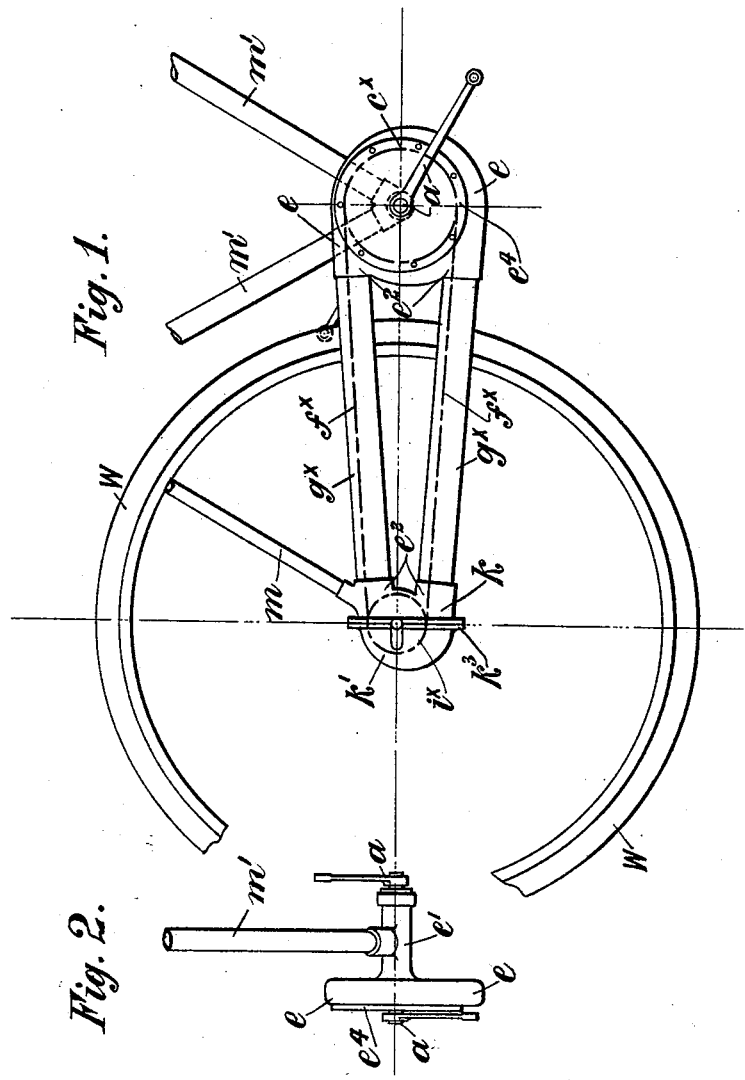

ZACHARY HARRIS KINGDON, OF LONDON, ENGLAND, ASSIGNOR TO DAVID ALEXANDER McNEIGHT, OF LIVERPOOL, ENGLAND.

VELOCIPEDE.

SPECIFICATION forming part of Letters Patent No. 614,174, dated November 15, 1898.

Application filed June 25, 1898. Serial No. 684,498. (No model.)

*To all whom it may concern:*

Be it known that I, ZACHARY HARRIS KINGDON, a subject of the Queen of Great Britain, and a resident of Lee, London, in the county of Kent, England, have invented certain new and useful Improvements in Velocipedes, of which the following is a specification.

The invention has been patented in Great Britain, No. 22,801, dated December 12, 1892.

This invention has reference to velocipedes, and more particularly bicycles; and it has for its object to provide improvements connected with the frames and driving-gears of bicycles of the present ordinary types in which the rear road-wheel is the driven wheel and power is transmitted to it from pedal-cranks and shafts or cranks and shafts between the rear and front wheel.

The invention will be described by the aid of the accompanying drawings.

Figure 1 is a side elevation, and Fig. 2 an end view, in which the power is transmitted from the pedal crank shaft or shafts to the rear wheel through chain-and-sprocket gearing.

Referring to the drawings, the power is transmitted from the crank-shaft $a$ to the road-wheel W by a sprocket-wheel $c^\times$ on the shaft $a$, a sprocket-wheel $i^\times$ on the wheel-hub of W, and a chain $f^\times$, as usual. According to this invention a casing integral with the frame of the cycle, both at the crank-axle part and the part at the rear road-wheel axle, is carried around the front sprocket-wheel, outside the chain, between this part and the back sprocket-wheel, both at the top and bottom run thereof, and around the rear sprocket-wheel, all of which parts are integral with each other and with the frame of the cycle, both at the front and back, and form part thereof.

The construction according to this invention is shown in the drawings. The sprocket-wheel $c^\times$ is inclosed within a casing $e$ at the front, which is cast in one with the axle-box $e'$ and forms a part of it, while the rear-wheel $i^\times$ is inclosed in a box-casing consisting of an inner half $k$ and an outer half, constituting a cap or cover $k'$. These two boxes or cases $e$ and $k$ are connected together above and below by closed tubes or members $g^\times$, which are brazed to or equivalently secured in sockets $e^2$ and form together an integral part of the frame of the bicycle, and they also serve as a casing or conduit through which the sprocket-chain $f^\times$ passes and by which it is inclosed; and the rear member $m$ of the bicycle-frame is also secured by brazing or equivalent fastening to the casing $k$, while the frame members $m'$ of the cycle are secured to the axle-box $e'$, as usual. Thus it will be seen the cases $e$ and $k$ and tubes $g^\times$ constitute the side frame of the bicycle between the axle-box $e'$ and the rear-wheel axle, and the axle-box $e'$ and frame members $m$ being integral with these parts the whole of these parts forms an integral portion of the whole bicycle-frame and takes all the strain to which the bicycle is subjected at this side. The frame of the bicycle running between this axle-box and the rear-wheel hub at the other side of the bicycle will be of the usual type.

The box-cover $k'$ is secured to $k$ by screws or bolts and a flange at $k^3$, as shown, so that it can be easily removed for gaining access to the sprocket-wheel $i^\times$, and the axis of the shaft of the wheel W is at this side of the machine secured in any known suitable way to the part $k$. Access also is had to the front gear-box $e$ by a plate $e^4$, which is screwed or bolted onto the front of $e$ and incloses a large opening in the front side of same.

What is claimed in respect of the herein-described invention is—

In a bicycle-gearing, in which the rear road-wheel is driven from a pedal crank-shaft in front of it, front and rear sprocket-wheels $c^\times$ $i^\times$, and chain $f^\times$, as described; a casing $e$ extending outside and around the front driving sprocket-wheel, and integral with the crank-axle and frame of the bicycle; a casing extending outside and around the rear driven sprocket-wheel; and casing-tubes $g^\times$ outside the upper and lower lengths of chain between these forward and rear casing portions $e$ and $k$, and integral with same; said forward, rear, and intermediate parts forming together an integral portion of the frame of the cycle at one side between the crank-axle and rear part of the frame, and taking all the strains to which it is subjected at this part; substantially as set forth.

In witness whereof I have hereunto set my hand in presence of two witnesses.

ZACHARY HARRIS KINGDON.

Witnesses:
WILLIAM JOHN WEEKS,
RICHARD BUNDY.